(12) United States Patent
Stefanatos et al.

(10) Patent No.: US 12,439,445 B2
(45) Date of Patent: Oct. 7, 2025

(54) CHANNEL OCCUPANCY TIME SHARING AWARE RESOURCE SELECTION FOR UNLICENSED CV2X COMMUNICATIONS

(71) Applicant: QUALCOMM Incorporated, San Diego, CA (US)

(72) Inventors: Stelios Stefanatos, San Diego, CA (US); Arthur Gubeskys, San Diego, CA (US); Shuanshuan Wu, San Diego, CA (US); Parisa Cheraghi, Cambridge (GB)

(73) Assignee: QUALCOMM Incorporated, San Diego, CA (US)

( * ) Notice: Subject to any disclaimer, the term of this patent is extended or adjusted under 35 U.S.C. 154(b) by 359 days.

(21) Appl. No.: 18/041,341

(22) PCT Filed: Aug. 24, 2021

(86) PCT No.: PCT/US2021/071267
§ 371 (c)(1),
(2) Date: Feb. 10, 2023

(87) PCT Pub. No.: WO2022/087551
PCT Pub. Date: Apr. 28, 2022

(65) Prior Publication Data
US 2023/0309141 A1    Sep. 28, 2023

(30) Foreign Application Priority Data
Oct. 19, 2020  (GR) .............................. 20200100629

(51) Int. Cl.
*H04W 74/04*   (2009.01)
(52) U.S. Cl.
CPC .................................. *H04W 74/04* (2013.01)

(58) Field of Classification Search
CPC ... H04W 72/02; H04W 74/002; H04W 74/04; H04W 74/08; H04W 74/0808
See application file for complete search history.

(56) References Cited

U.S. PATENT DOCUMENTS

| 2021/0368351 A1* | 11/2021 | Cui | ..................... H04W 74/002 |
| 2022/0078845 A1* | 3/2022 | Xu | ......................... H04L 5/0053 |
| 2022/0167402 A1* | 5/2022 | Liu | ........................ H04W 28/04 |

FOREIGN PATENT DOCUMENTS

| EP | 3817428 A1 | 5/2021 | |
| EP | 4290970 A1 * | 12/2023 | ........ H04W 74/0816 |
| WO | WO-2020024854 A1 | 2/2020 | |
| WO | WO-2020164439 A1 | 8/2020 | |

OTHER PUBLICATIONS

International Search Report and Written Opinion—PCT/US2021/071267—ISA/EPO—Dec. 3, 2021.

* cited by examiner

*Primary Examiner* — Kashif Siddiqui
(74) *Attorney, Agent, or Firm* — Harrity & Harrity, LLP

(57) ABSTRACT

Various aspects of the present disclosure generally relate to wireless communication. In some aspects, a user equipment (UE) may select, from an available resource pool, one or more resources for transmitting a packet on a channel. The UE may determine that a new shared channel occupancy time (COT) has been initiated on the channel. The UE may adapt at least one resource of the one or more resources for transmitting the packet based at least in part on determining that the new shared COT has been initiated. Numerous other aspects are provided.

30 Claims, 10 Drawing Sheets

CHANNEL OCCUPANCY TIME SHARING AWARE RESOURCE SELECTION FOR UNLICENSED CV2X COMMUNICATIONS

CROSS-REFERENCE TO RELATED APPLICATIONS

This Patent Application is a 371 national stage of PCT Application No. PCT/US2021/071267 filed on Aug. 24, 2021, entitled "CHANNEL OCCUPANCY TIME SHARING AWARE RESOURCE SELECTION FOR UNLICENSED CV2X COMMUNICATIONS," which claims priority to Greece Patent Application No. 20200100629, filed on Oct. 19, 2020, entitled "CHANNEL OCCUPANCY TIME SHARING AWARE RESOURCE SELECTION FOR UNLICENSED CV2X COMMUNICATIONS," and assigned to the assignee hereof. The disclosure of the prior Applications are considered part of and are incorporated by reference into this Patent Application.

FIELD OF THE DISCLOSURE

Aspects of the present disclosure generally relate to wireless communication and to techniques and apparatuses for channel occupancy time (COT) sharing aware resource selection for unlicensed cellular vehicle to everything (CV2X) communications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes selecting, from an available resource pool, one or more resources for transmitting a packet on a channel; determining that a new shared channel occupancy time (COT) has been initiated on the channel; and adapting at least one resource of the one or more resources for transmitting the packet based at least in part on determining that the new shared COT has been initiated.

In some aspects, a UE for wireless communication includes a memory and one or more processors coupled to the memory, the one or more processors configured to: select, from an available resource pool, one or more resources for transmitting a packet on a channel; determine that a new shared COT has been initiated on the channel; and adapt at least one resource of the one or more resources for transmitting the packet based at least in part on determining that the new shared COT has been initiated.

In some aspects, a non-transitory computer-readable medium storing a set of instructions for wireless communication includes one or more instructions that, when executed by one or more processors of a UE, cause the UE to: select, from an available resource pool, one or more resources for transmitting a packet on a channel; determine that a new shared COT has been initiated on the channel; and adapt at least one resource of the one or more resources for transmitting the packet based at least in part on determining that the new shared COT has been initiated.

In some aspects, an apparatus for wireless communication includes means for selecting, from an available resource pool, one or more resources for transmitting a packet on a channel; means for determining that a new shared COT has been initiated on the channel; and means for adapting at least one resource of the one or more resources for transmitting the packet based at least in part on determining that the new shared COT has been initiated.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
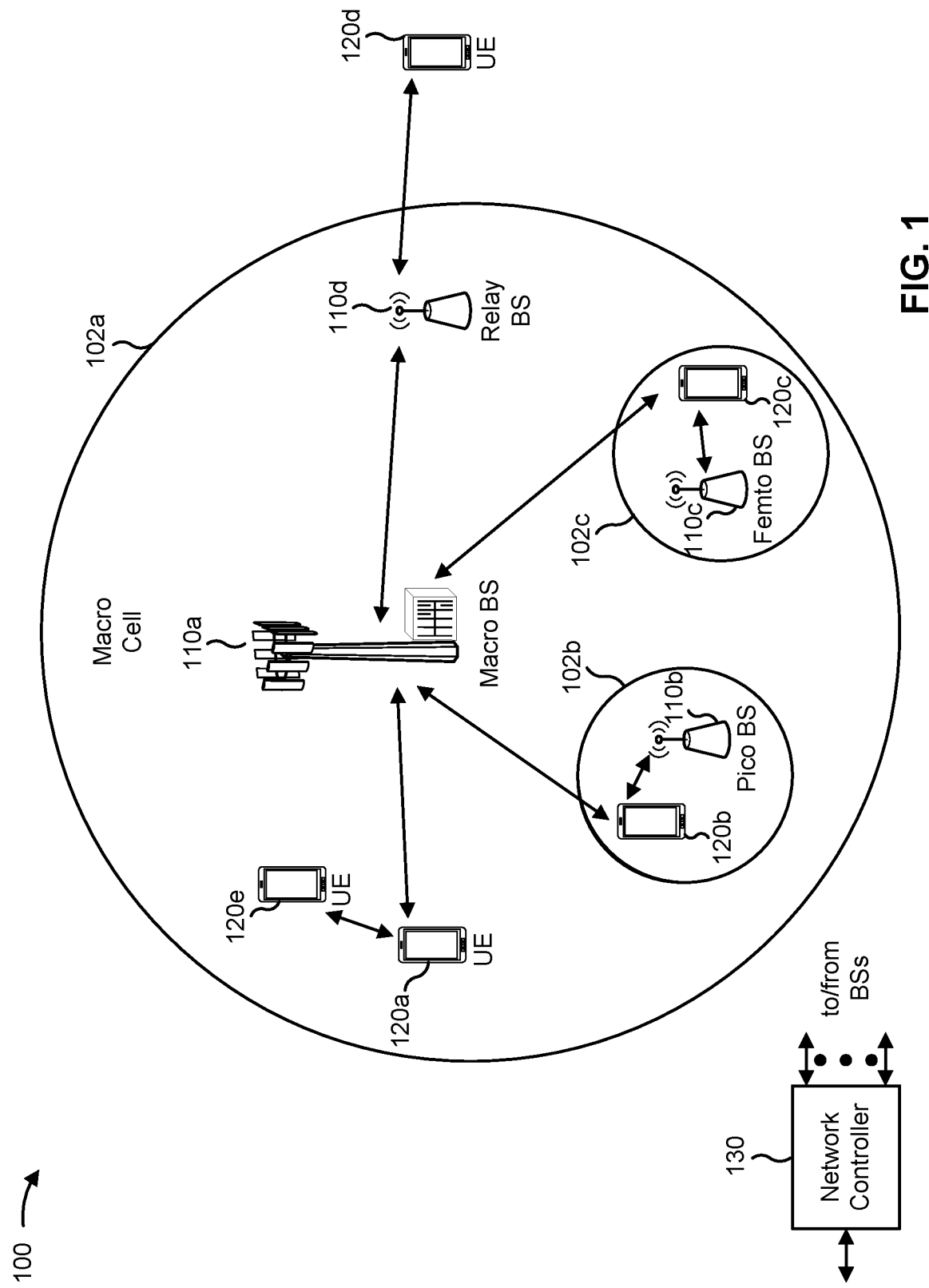
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wristbands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, a UE 120 may perform cellular V2X (CV2X) communications in an unlicensed frequency band. In this case, the UE 120 may perform a CV2X resource selection procedure to select resources for transmitting a packet on a channel in the unlicensed frequency band. The UE 120 may have to perform a listen-before-talk (LBT) procedure prior to each transmission on a selected resource to sense whether the channel is idle. If the UE 120 senses that the channel is busy, the UE 120 may be prevented from transmitting the packet using the selected resources.

As indicated above, FIG. 1 is provided as an example. Other examples may differ from what is described with regard to FIG. 1.

Figure 2:
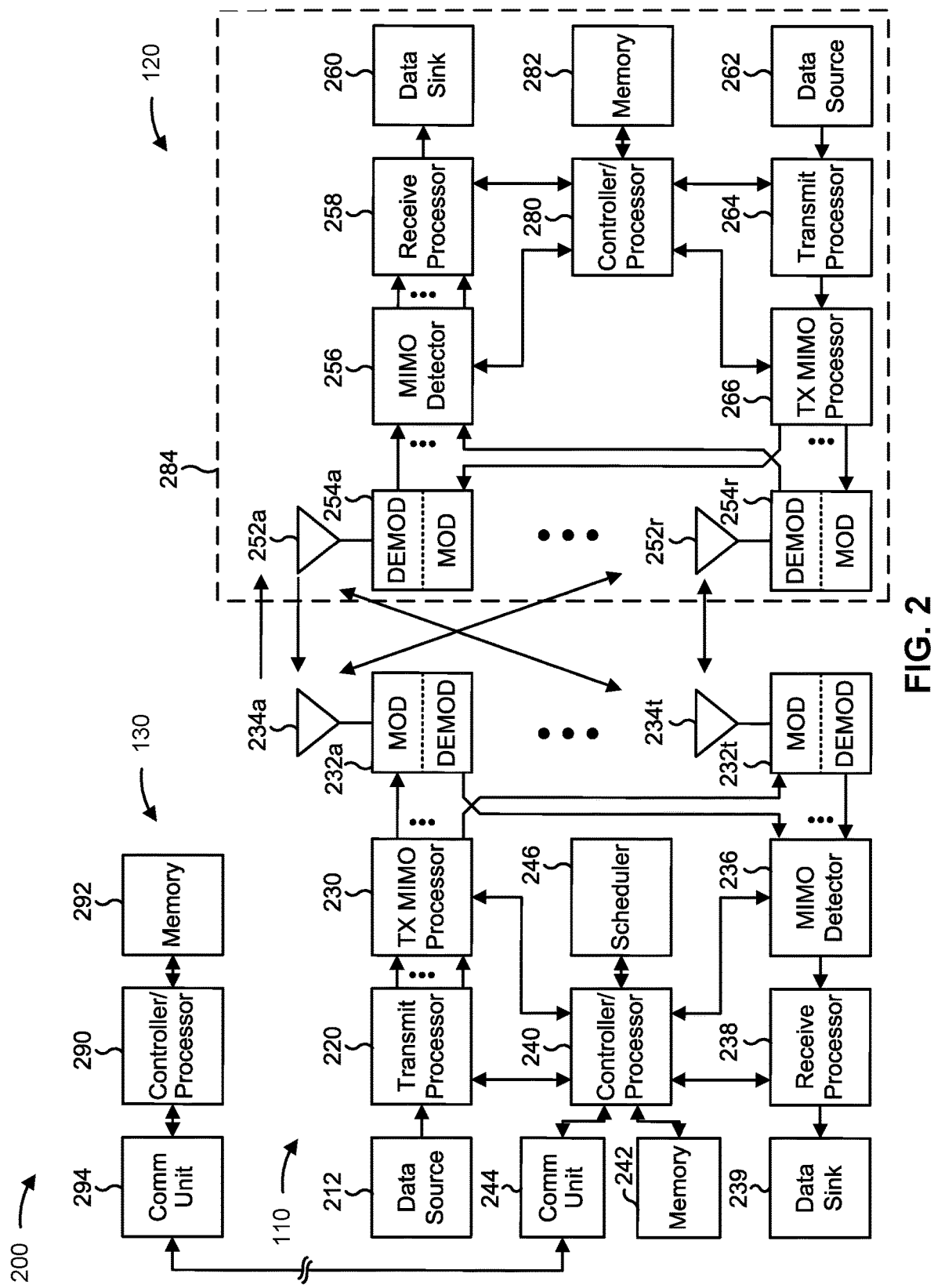
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 6-9).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 6-9).

Controller/processor 240 of base station 110, controller/processor 280 of UE 120, and/or any other component(s) of FIG. 2 may perform one or more techniques associated with channel occupancy time (COT) sharing aware resource selection for unlicensed CV2X communications, as described in more detail elsewhere herein. For example, controller/processor 240 of base station 110, controller/processor 280 of UE 120, and/or any other component(s) of FIG. 2 may perform or direct operations of, for example, process 900 of FIG. 9, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, and/or other processes as described herein. In some aspects, executing instructions may include running the instructions, converting the instructions, compiling the instructions, and/or interpreting the instructions, among other examples.

In some aspects, the UE 120 includes means for selecting, from an available resource pool, one or more resources for transmitting a packet on a channel; means for determining that a new shared COT has been initiated on the channel; and/or means for adapting at least one resource of the one or more resources for transmitting the packet based at least in part on determining that the new shared COT has been initiated. The means for the UE 120 to perform operations described herein may include, for example, antenna 252, demodulator 254, MIMO detector 256, receive processor 258, transmit processor 264, TX MIMO processor 266, modulator 254, controller/processor 280, and/or memory 282.

In some aspects, the UE 120 includes means for transmitting the packet on the channel in the one or more resources including the at least one resource adapted based at least in part on determining that the new shared COT has been initiated. In some aspects, the UE 120 includes means for tracking newly initiated shared COTs on the channel in a time window including the one or more resources selected for transmitting the packet; and/or means for determining, during the time window, that the new shared COT has been initiated on the channel. In some aspects, the UE 120 includes means for moving a next resource of the one or more resources from an initial slot to an adapted slot within the new shared COT. In some aspects, the UE 120 includes means for transmitting the packet on the channel in the adapted slot within the new shared COT.

In some aspects, the UE 120 includes means for transmitting the packet on the channel in the adapted slot within the new shared COT without performing an LBT procedure. In some aspects, the UE 120 includes means for transmitting the packet on the channel in the adapted slot within the new shared COT without performing a Category 4 LBT procedure. In some aspects, the UE 120 includes means for transmitting the packet on the channel in the adapted slot within the new shared COT after performing a Category 2 LBT procedure. In some aspects, the UE 120 includes means for selecting initial slots for the one or more resources for transmitting the packet on the channel; means for determining that an existing shared COT is active on the channel; and/or means for moving a first resource of the one or more resources from the initial slot for the first resource to a slot within the existing shared COT.

In some aspects, the UE 120 includes means for receiving sidelink control information identifying the new shared COT that has been initiated on the channel. In some aspects, the UE 120 includes means for adapting the at least one resource based at least in part on determining that the new shared COT has been initiated, and based at least in part on a determination that an adapting condition related to the one or more resources is satisfied. In some aspects, the UE 120 includes means for moving the at least one resource from an initial slot to an adapted slot within the new COT based at least in part on a determination that the adapted slot is at least a threshold number of slots later than a slot associated with a previous transmission of the one or more resources. In some aspects, the UE 120 includes means for randomly selecting the one or more resources from the available resource pool. In some aspects, the UE 120 includes means for selecting a resource for a first transmission of the packet on the channel and one or more other resources for re-transmissions of the packet on the channel.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
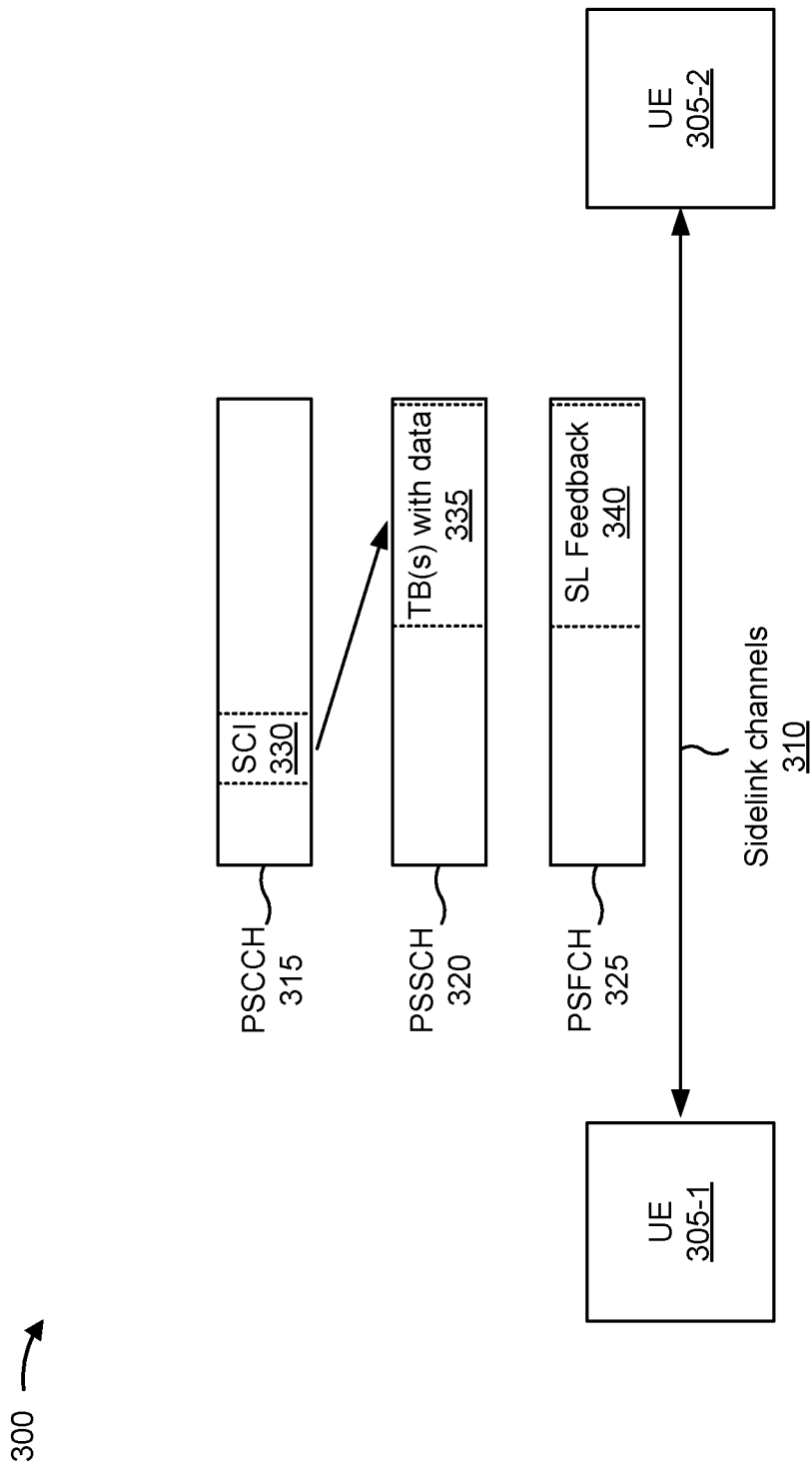
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or vehicle-to-pedestrian (V2P) communications), and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, and/or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or an MCS to be used for the upcoming sidelink transmission. In some aspects, a UE 305 may generate a sidelink grant that indicates one or more parameters for a semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
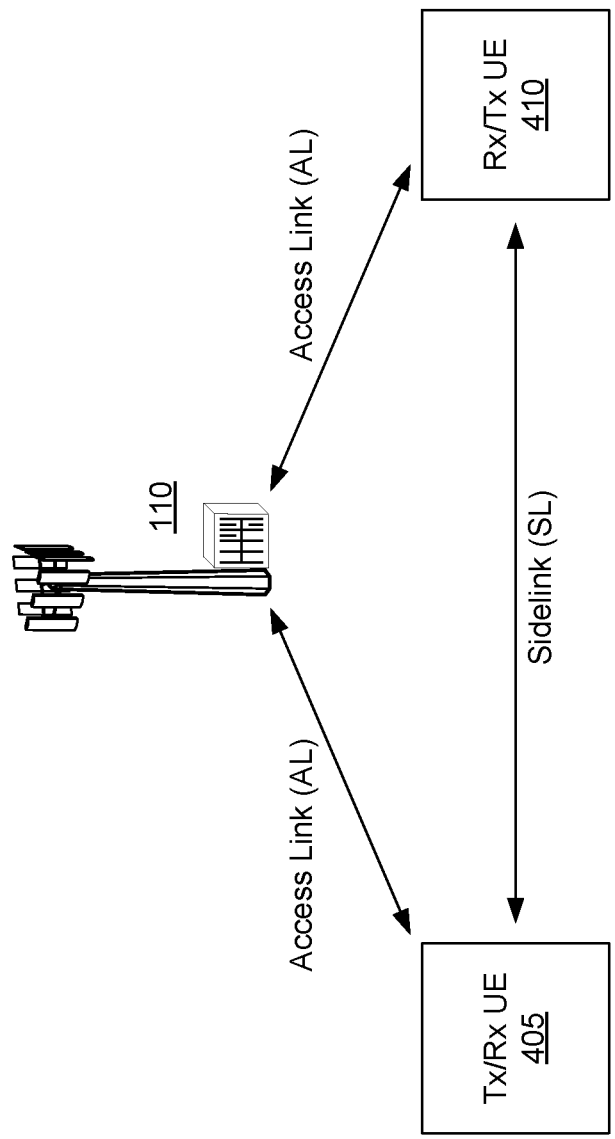
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

In a shared or unlicensed frequency band, a transmitting device may contend against other devices for channel access before transmitting on a shared or unlicensed channel to reduce and/or prevent collisions on the shared or unlicensed channel. To contend for channel access, the transmitting device may perform a channel access procedure, such as an LBT procedure or another type of channel access procedure, for shared or unlicensed frequency band channel access. The channel access procedure may be performed to determine whether the physical channel (e.g., the radio resources of the channel) are free to use or are busy (e.g., in use by another wireless communication device such as a UE, an IoT device, or a WLAN device, among other examples). The channel access procedure may include sensing or measuring the physical channel (e.g., performing an RSRP measurement, detecting an energy level, or performing another type of measurement) during a channel access gap (which may also be referred to as a contention window (CW)) and determining whether the shared or unlicensed channel is free or busy based at least in part on the signals sensed or measured on the physical channel (e.g., based at least in part on whether the measurement satisfies a threshold). If the transmitting device determines that the channel access procedure was successful, the transmitting device may perform one or more transmissions on the shared or unlicensed channel during a transmission opportunity (TXOP), which may extend for a COT.

Figure 5:
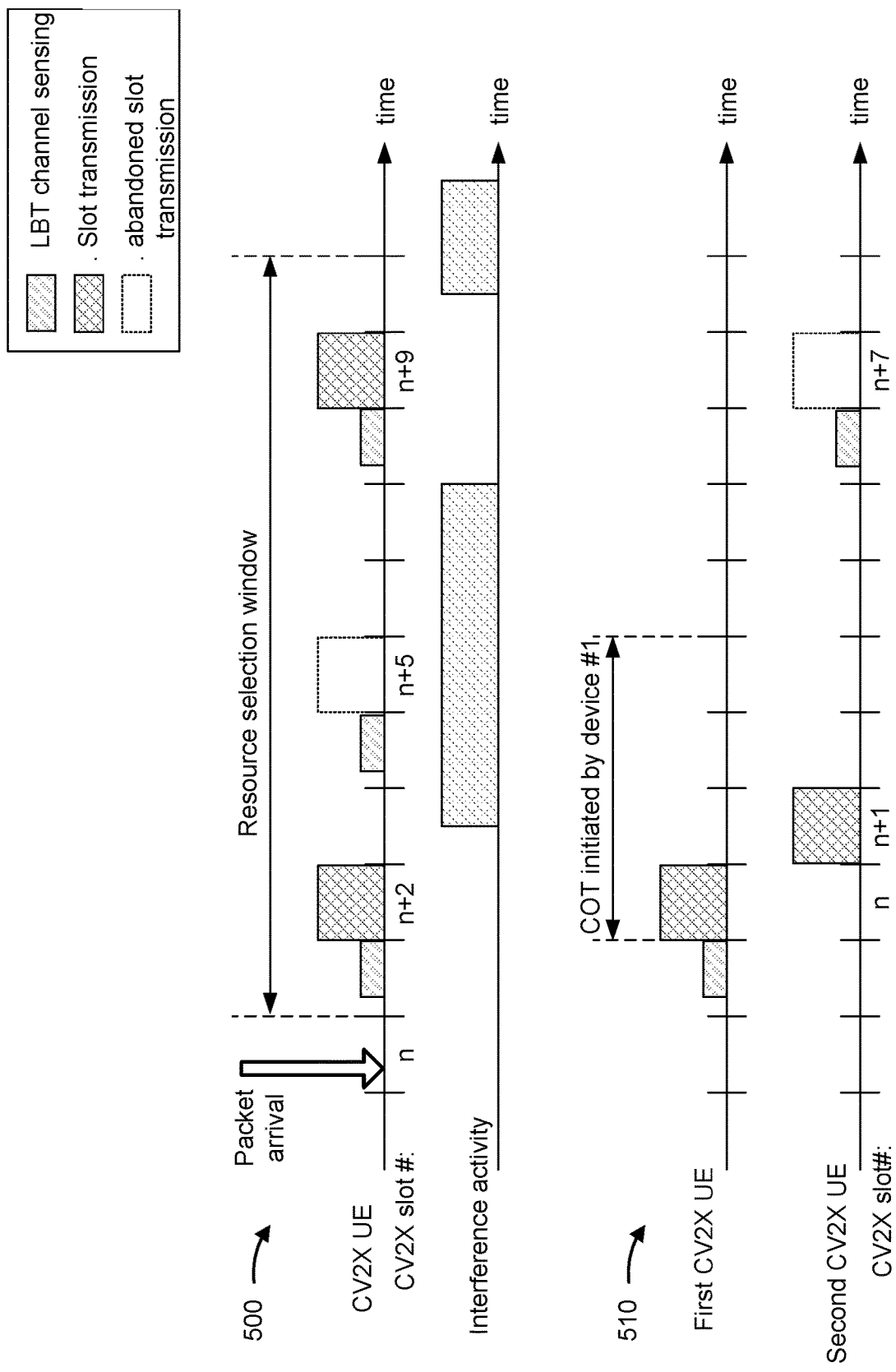
FIG. 5 is a diagram illustrating examples of resource selection for unlicensed cellular vehicle to everything (CV2X) communications, in accordance with the present disclosure.

FIG. 5 is a diagram illustrating examples 500 and 510 of resource selection for unlicensed CV2X communications, in accordance with the present disclosure.

A common requirement for a wireless communication device to operate in an unlicensed frequency band is for the wireless communication device to perform an LBT procedure prior to any transmission attempt. In CV2X communications, in order to transmit a packet, a CV2X UE may select future resources (e.g., slots and/or sub-channels) over which to transmit, and possibly re-transmit, the packet. In a case in which the CV2X UE is transmitting the packet over a channel in an unlicensed band, the CV2X UE may have to perform a Category 4 (Cat4) LBT prior to the start of each of the selected slots. A Cat4 LBT procedure is a procedure that senses whether the channel is idle for a duration that includes a fixed (pre-configured) interval plus an addition interval of random duration. If the LBT procedure senses that the channel is idle, the CV2X UE may proceed with transmitting the packet in the selected slot. If the LBT procedure senses that the channel is busy, the CV2X UE may not transmit the packet and the slot is "lost." In this case, the UE may attempt to transmit the packet in the following slot. However, the interference detected by the LBT procedure may be persistent over many consecutive slots. In some cases, all or most of the slots within the resource selection window may be blocked by the LBT procedure, effectively dropping the packet transmission altogether or reducing the number of re-transmissions. This may result in reduced reliability and increased latency for CV2X communications.

As shown in example 500, a packet arrival in a buffer of a CV2X UE may occur at CV2X slot n. The packet arrival may trigger the CV2X UE to perform a resource selection algorithm to select multiple future resources for transmitting the packet. The selected resources may be constrained to lie within a resource selection window that is limited in time by a packet delay budget associated with the transmission. In example 500, the CV2X UE selects three resources in slots n+2, n+5, and n+9, targeting up to three transmissions for the packet. For example, the second and third transmissions may be blind re-transmissions or may be triggered by HARQ feedback.

Due to regulations for operating in the unlicensed band, prior to the start of each selected slot (n+2, n+5, and n+9), the CV2X UE may need to perform an LBT channel sensing procedure (e.g., Cat4 LBT) to detect whether there is interference activity on the channel. For example, the interference activity may be due to a WiFi device operating in the unlicensed channel, among other examples. In example 500, the interference activity is such that the LBT procedure senses that the channel is idle for slots n+2 and n+9, and the CV2X UE may proceed with the transmissions in those slots. However, in example 500, due to the interference activity, the LBT procedure senses that slot n+5 is not available, and the transmission in slot n+5 may be aborted. In example 500, the interference activity persists over multiple slots after slot n+5, rendering those slots unavailable in case the CV2X UE attempts to retry the transmission.

In some aspects, COT sharing among CV2X among CV2X devices may reduce the probability of a CV2X UE getting blocked by LBT channel sensing when attempting to access a channel in an unlicensed band. In this case, a single LBT procedure by a single UE may be used to enable multiple transmissions from multiple UEs, possibly occurring over multiple consecutive slots. A UE may initiate a COT on a channel using a channel sensing procedure, such as LBT (e.g., Cat4 LBT). Alternatively, a COT may also be initiated by other CV2X devices, such as a base station or a roadside unit (RSU), among other examples. The COT may include resources spanning a plurality of slots (e.g., 4-20 slots). The UE may transmit information regarding the COT (e.g., in SCI), including the remaining COT duration. Other UEs may decode the information regarding the COT and proceed in transmitting packets on the channel at any time within the COT, either without performing LBT or by first performing a "light" (e.g., deterministic duration) LBT (e.g., Category 2 (Cat2) LBT).

As shown in example 510, a first CV2X UE may perform an LBT channel sensing procedure prior to slot n. The LBT procedure may sense that the channel is idle, and the first CV2X UE may transmit a packet in slot n. This transmission may initiate a new COT, and the first CV2X UE may broadcast SCI to inform other UEs that the new COT has been initiated and will last for a total of 4 slots. A second CV2X UE may have previously selected a resource in slot n+1 for transmission of a packet. The second CV2X UE may be made aware of the COT initiated by the first CV2X UE. Since the COT includes slot n+1, the second CV2X UE may transmit the packet in slot n+1 without performing the LBT procedure that is typically required (e.g., the Cat4 LBT procedure). For example, the second CV2X UE may transmit the packet in slot n+1 without performing an LBT procedure, or the second CV2X may perform a light LBT (e.g., Cat2 LBT) that has a greater chance of success than a Cat4 LBT. For the selected resource in slot n+7, the second CV2X UE may need to perform Cat4 LBT since there is no active COT that includes slot n+7. As shown in example 510, the LBT procedure may sense that the channel is busy and block the transmission in slot n+7.

As indicated above, FIG. 5 is provided as an example. Other examples may differ from what is described with respect to FIG. 5.

As described above, a CV2X UE may be required to perform an LBT procedure prior to each slot selected for packet transmission on a channel of an unlicensed band. This may result in packet-dropping packet transmission and/or reducing the number of packet re-transmissions due to the LBT procedure sensing interference activity, which may cause reduced reliability and increased latency of CV2X communications. Although COT sharing may reduce the probability that a packet transmission is blocked by the LBT procedure, the CV2X resource selection procedure in the current 3GPP specification is independent of COT sharing. That is, the current CV2X resource selection procedure ignores the possibility of an existing shared COT, let alone a COT that will be generated in the future. Thus, a CV2X UE cannot utilize COT sharing unless a future selected resource is part of a shared COT. Furthermore, with the resource selection window typically spanning tens of milliseconds (ms) (e.g., 50 ms) and a maximum COT duration typically less than 8 ms, a CV2X UE cannot typically determine, during the CV2X resource selection procedure, whether a future resource will be part of a shared COT.

Some techniques and apparatuses described herein enable COT-sharing aware resource selection for unlicensed CV2X communications by a UE. The UE may select, from an available resource pool, resources for transmitting a packet on a channel. The UE may determine that a new shared COT has been initiated on the channel and adapt at least one resource of the selected resources based at least in part on determining that the new shared COT has been initiated. For example, the UE may move a selected resource from an initial slot associated with the selected resource to a slot within the new shared COT. As a result, the UE may perform flexible adaptation of selected resources for CV2X communications to increase transmissions in shared COTs, and thus decrease transmissions that are preceded by an LBT procedure. This may result in increased reliability and decreased latency for CV2X communications.

Figure 6:
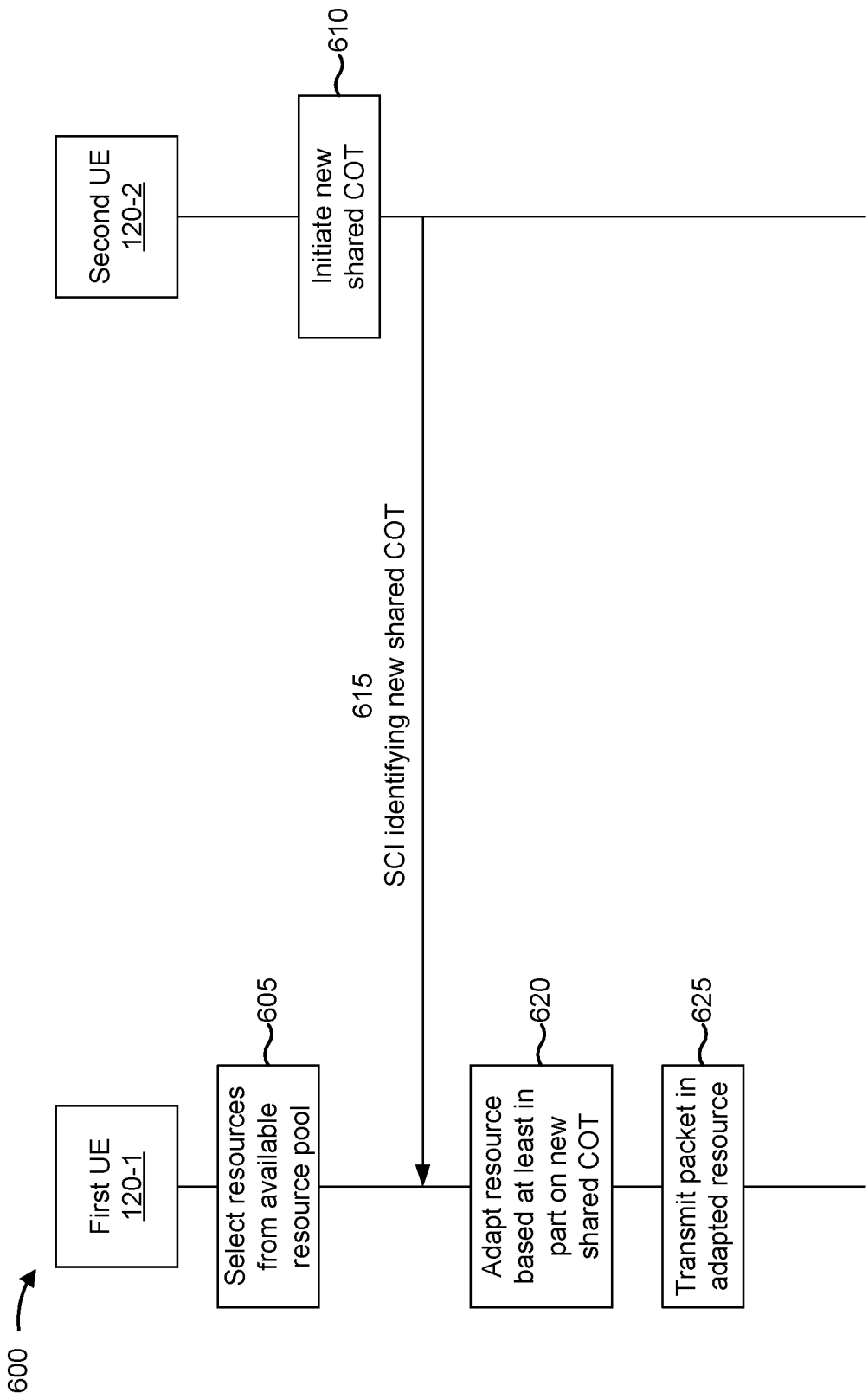
FIGS. 6-8 are diagrams illustrating examples associated with channel occupancy time (COT) sharing aware resource selection for unlicensed CV2X communications, in accordance with the present disclosure.

FIG. 6 is a diagram illustrating an example 600 associated with COT-sharing aware resource selection for unlicensed CV2X communications, in accordance with the present disclosure. As shown in FIG. 6, example 600 includes communication between a first UE 120-1 and a second UE 120-2. In some aspects, the first UE 120-1 and the second UE 120-2 may be included in a wireless network, such as wireless network 100. The first UE 120-1 and the second UE 120-2 may communicate via one or more sidelink channels as described elsewhere herein, such as the sidelink communications described with respect to the UEs 305-1 and 305-2. In some aspects, the first UE 120-1 and the second UE 120-2 may be CV2X UEs that communicate via a CV2X communication network.

Figure 10:
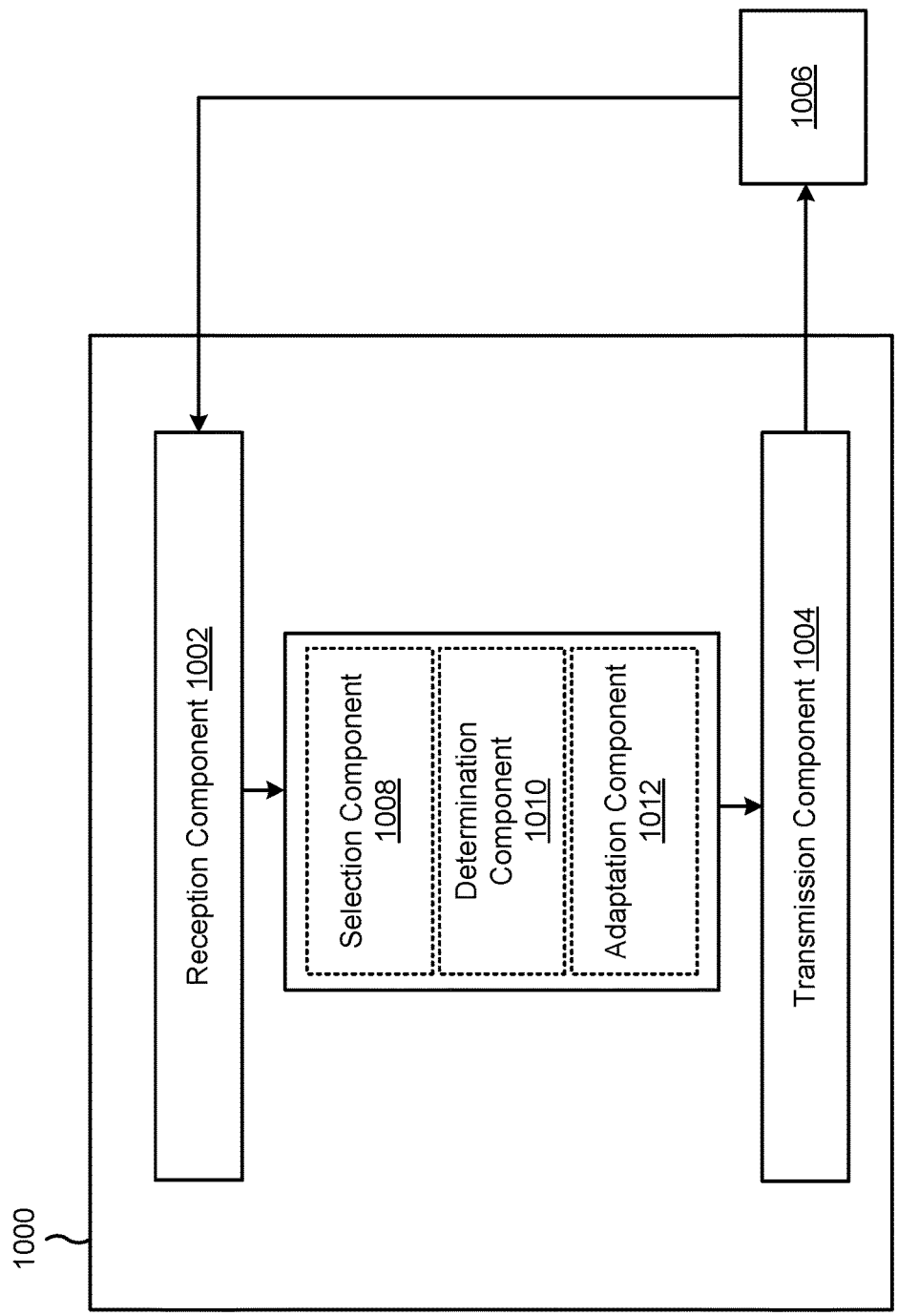
FIG. 10 is a block diagram of an example apparatus for wireless communication, in accordance with the present disclosure.

As shown in FIG. 6, and by reference number 605, the first UE 120-1 may select (e.g., using controller/processor 280 and/or selection component 1008 of FIG. 10) resources for transmitting a packet. The first UE 120-1 may select the resources from an available resource pool. In some aspects, the selected resources may be associated with slots and/or subchannels in which to transmit the packet on the channel, and the available resource pool may be a resource selection window spanning a plurality of slots. In some aspects, the channel may be a channel in an unlicensed band, such as an unlicensed CV2X channel. The first UE 120-1 may perform the resource selection based at least in part on a determination, by the first UE 120-1, that a packet is ready to be transmitted. For example, the resource selection by the first UE 120-1 may be triggered by the arrival of a packet in a buffer of the first UE 120-1.

The first UE 120-1 may perform initial selection of the resources using a CV2X resource selection procedure. For example, the first UE 120-1 may perform random and/or uniform selection of resources within the available resource pool. The first UE 120-1 may select one or more resources for transmitting the packet. In some aspects, the first UE 120-1 may select multiple resources for transmitting the packet in different slots. For example, the first UE 120-1 may select a resource for an initial transmission of the packet and may select one or more other resources for re-transmissions of the packet. The re-transmissions may be blind re-transmissions or may be triggered by HARQ feedback.

In some aspects, the first UE 120-1 may determine that an existing shared COT is active when the resources are selected. In this case, if none of the randomly selected resources are within the existing shared COT, the first UE 120-1 may move the selected resource for the first transmission within the active COT so that the first UE 120-1 can skip an LBT procedure for the first transmission.

As further shown in FIG. 6, and by reference number 610, the second UE 120-2 may initiate (e.g., using controller/processor 280, transmit processor 264, TX MIMO processor 266, MOD 254, antenna 252, and/or transmission component 1004) a new shared COT on the channel. The second UE 120-2 may perform an LBT procedure, such as Cat4 LBT on the channel and determine that the channel is idle. The second UE 120-2 may then transmit a packet on the channel in a slot and initiate the new shared COT on the channel that includes resources spanning one or more subsequent slots. This transmission (and initiation of the new shared COT), by the second UE 120-2 may occur within a time window that includes the resources selected by the first UE 120-1.

As further shown in FIG. 6, and by reference number 615, the second UE 120-2 may transmit (e.g., using controller/processor 280, transmit processor 264, TX MIMO processor 266, MOD 254, antenna 252, and/or transmission component 1004) SCI identifying the new shared COT. For example, the second UE 120-2 may broadcast the SCI such that the SCI can be received by other UEs within a range of the second UE 120-2.

The first UE 120-1 may track (e.g., using antenna 252, DEMOD 254, MIMO detector 256, receive processor 258, controller/processor 280, reception component 1002, and/or determination component 1010) newly initiated shared COTs during a time window associated with transmitting the packet by the first UE 120-1. For example, the time window may begin once the initial selection of resources is performed and last until a final re-transmission of the packet or until the packet delay budget for transmitting the packet has been exhausted. During the time window, the first UE 120-1 may determine whether new shared COTs are initiated based at least on SCI received from the second UE 120-2 and/or one or more other UEs. The first UE 120-1 may receive the SCI identifying the new shared COT that has been initiated by the second UE 120-2. The first UE 120-1 may determine that the new shared COT has been initiated based at least on the SCI received from the second UE 120-2.

As further shown in FIG. 6, and by reference number 620, the first UE 120-1 may adapt (e.g., using controller/processor 280 and/or adaptation component 1012) at least one resource of the selected resources based at least in part on determining that the new shared COT has been initiated. In some aspects, the first UE 120-1 may move a next resource of the selected resources (e.g., a resource for the next occurring transmission), from the initial slot associated with that resource to a slot within the new shared COT.

In some aspects, the first UE 120-1 may determine whether an adapting condition for adapting a resource to be in the new shared COT is satisfied, and adapt at least one resource of the selected resources based at least in part on a determination that the adapting condition is satisfied. In some aspects, the adapting condition may be a condition that an adapted slot, within the new shared COT, for a resource is at least N slots later than a slot associated with a previous transmission of the packet (e.g., a transmission of the packet in a previous resource). In this case, the first UE 120-1 may move the next resource to an adapted slot within the new shared COT based at least in part on a determination that the adapted slot is at least N slots after a slot in which the previous transmission of the packet occurred. For example, N may be set to be greater than or equal to one. In some aspects, N may be greater than one. In this case, the first UE 120-1 is prevented from moving a resource to a slot that is adjacent to (or within N slots of) the slot in which the packet was previously transmitted.

In some aspects, N may be configured and broadcast by the network. In this case, an indication of the value for N may be transmitted by a wireless network device (e.g., a base station or another UE) and received by the first UE 120-1. In some aspects, the first UE 120-1 may determine and/or adapt the value for N based at least in part on measurements performed by the first UE 120-1 and/or parameters of the first UE 120-1. In some aspects, the first UE 120-1 may determine the value for N based in part on a CBR measured for the channel. In some aspects, the first UE 120-1 may determine the value for N based at least in part on whether the first UE 120-1 is performing blind re-transmissions of HARQ feedback-triggered re-transmissions. In some aspects, the first UE 120-1 may determine the value for N based at least in part on a total number of transmissions targeted for the packet.

Without the adapting condition, whenever a new shared COT is identified, there may be cases in which the first UE 120-1 will move all pending resources into the new shared COT. These transmissions may be moved to be performed in adjacent slots in the new shared COT. This may result in a lack of time diversity for the transmissions, which may cause the transmissions to experience the same interference conditions. By enforcing the adapting condition in which a transmission resource is not moved to a slot that is within N slots of a previous transmission, the first UE 120-1 may maintain the benefit of multiple transmissions with roughly independent interference and channel conditions. As a result, reliability of CV2X communications may be increased.

As further shown in FIG. 6, and by reference number 625, the first UE 120-1 may transmit (e.g., using controller/processor 280, transmit processor 264, TX MIMO processor 266, MOD 254, antenna 252, and/or transmission component 1004) the packet in the adapted resource. For example, the first UE 120-1 may transmit the packet in an adapted slot within the new shared COT to which the next resource has been moved, instead of in the initial slot for the next resource. In some aspects, the first UE 120-1 may transmit the packet in the adapted slot within the new shared COT without performing an LBT procedure. In some aspects, the first UE 120-1 may perform a light LBT procedure (e.g., Cat2 LBT) prior to transmitting the packet in the adapted slot within the new shared COT, instead of performing a full LBT procedure (e.g., Cat4 LBT). After transmission occurs for a selected resource, the first UE 120-1 may continue monitoring for newly initiated COTs for any remaining resources, until the last transmission occurs or until there is no packet delay budget remaining.

The first UE 120-1 may perform a respective packet transmission for each selected resource. As described above, a selected resource may be moved from an initial slot to a slot within a COT. For a transmission that occurs in a slot within a COT, the first UE 120-1 may transmit the packet without performing an LBT procedure or after a light LBT procedure (e.g., Cat2 LBT) is successfully performed. If an initial slot associated with a selected resource is reached and the resource has not been moved to a slot within a COT, the first UE 120-1 may transmit the packet in the initial slot associated with the selected resource. For a transmission in a slot that is not within a COT, the first UE 120-1 may perform an LBT procedure (e.g., Cat4 LBT), and transmit the packet based at least in part on a determination that the LBT procedure is successful (e.g., the channel is idle). In this case, the first UE 120-1 may initiate a new shared COT when transmitting the packet and broadcast SCI including information regarding the new shared COT.

As described above in connection with FIG. 6, the first UE 120-1 may select, from an available resource pool, resources for transmitting a packet on a channel. The first UE 120-1 may determine that a new shared COT has been initiated on the channel and adapt a resource of the selected resources to move the resource from an initial slot to a slot within the new shared COT. The first UE 120-1 may transmit the packet in the slot within the COT without performing an LBT procedure or after performing a light LBT procedure. As a result, the first UE 120-1 may increase transmissions in shared COTs, and thus decrease transmissions that are preceded by a full LBT procedure. This may result in increased reliability and decreased latency for CV2X communications.

As indicated above, FIG. 6 is provided as an example. Other examples may differ from what is described with respect to FIG. 6.

Figure 7:
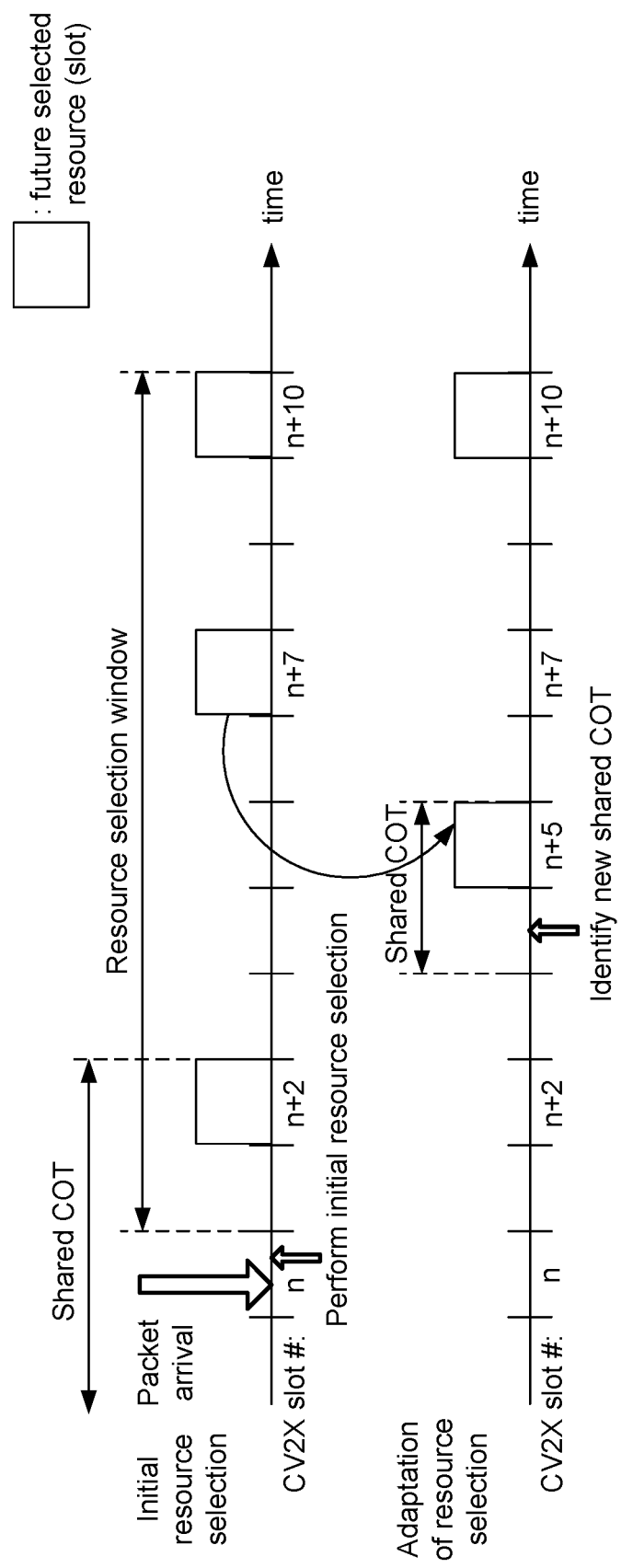

FIG. 7 is a diagram illustrating an example 700 associated with COT-sharing aware resource selection for unlicensed CV2X communications, in accordance with the present disclosure. As shown in FIG. 7, example 700 shows initial resource selection by a UE, and adaptation of the initial resource selection, by the UE, based at least in part on a determination that a new share COT has been initiated. In some aspects, the UE may be a CV2X UE.

As shown in FIG. 7, an arrival of a packet in a buffer of the UE at slot n may trigger the UE to perform initial resource selection. The UE may select resources in a resource selection window. In example 700, the UE selects three resources, and the initial slots associated with selected resources are slots n+2, n+7, and n+10. As shown in FIG. 7, an existing shared COT may be active at the time at which the initial resource selection is performed. In example 700, slots n+1 and n+2 are included within the existing shared COT. In some aspects, the UE may move the selected resource for the first transmission to a slot within the existing shared COT if the initial slot is not within the existing COT.

As further shown in FIG. 7, the UE may identify a new shared COT during slot n+4. In example 700, slots n+4 and n+5 are included in the new shared COT. The UE may then move the next resource from the initial slot (n+7) associated with that resource to an adapted slot (n+5) within the new shared COT. The UE may then transmit the packet in slot n+5 without performing an LBT procedure or after performing a light LBT procedure (e.g., Cat2 LBT) instead of a full LBT procedure (e.g., Cat4 LBT).

As indicated above, FIG. 7 is provided as an example. Other examples may differ from what is described with respect to FIG. 7.

Figure 8:
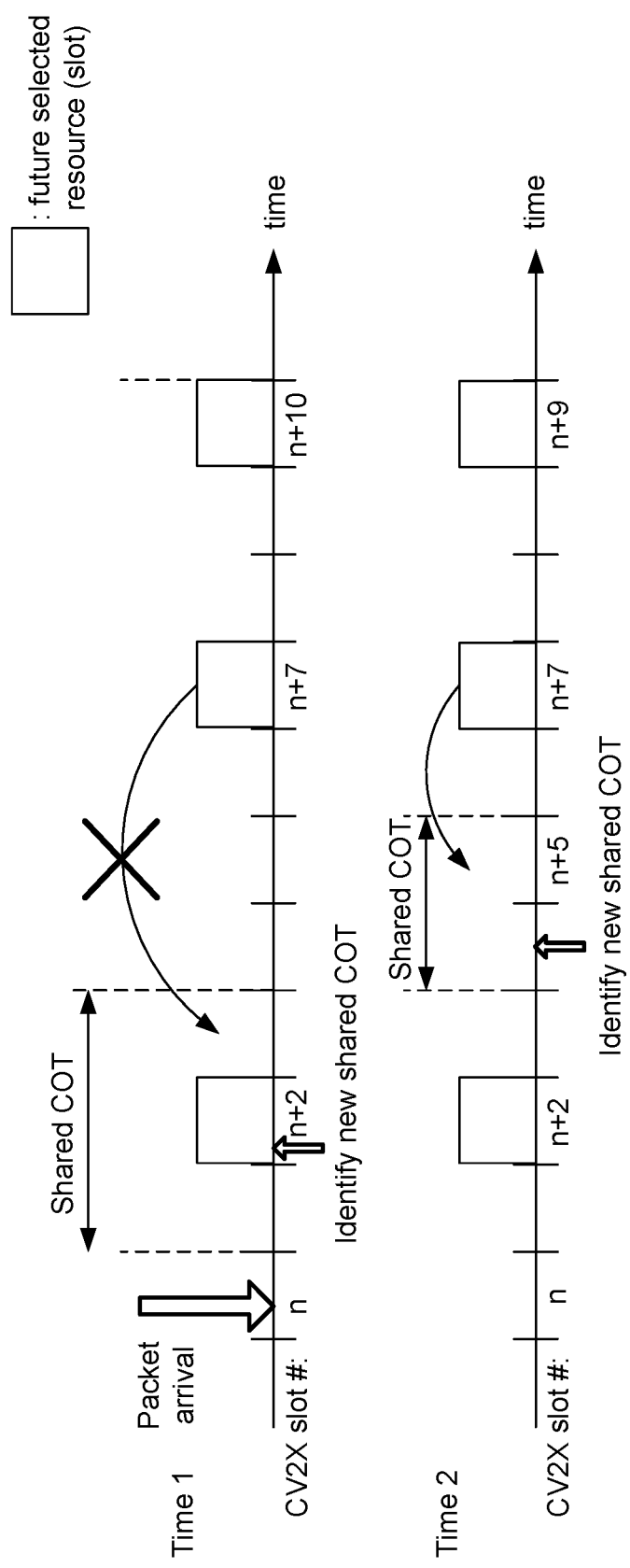

FIG. 8 is a diagram illustrating an example 800 associated with COT-sharing aware resource selection for unlicensed CV2X communications, in accordance with the present disclosure. As shown in FIG. 8, example 800 shows application, by a UE, of an adapting condition for determining whether to move a selected resource from an initial slot to an adapted slot within a shared COT. In example 800, the UE may apply the adapting condition that the adapted slot, to which a selected resource is moved, is at least N=3 slots later than a slot associated with a previous transmission of the packet. In some aspects, the UE may be a CV2X UE.

As shown in FIG. 8, in an initial resource selection, the UE may select three resources, and the initial slots associated with selected resources may be slots n+2, n+7, and n+10. At time 1, the UE may identify a first new shared COT during slot n+2. In example 800, slots n+1, n+2, and n+3 are included in the first new shared COT. The UE may perform the first transmission of the packet in slot n+2. The first new shared COT includes another slot (n+3) to which the UE could move the next selected resource. However, moving the next selected resource from n+7 to n+3 would result in fewer than N=3 slots between the slot (n+2) in which the previous transmission occurred and the adapted slot (n+3) to which the next resource would be moved. Accordingly, moving the next resource to the slot (n+3) within the first new shared COT does not satisfy the adapting condition, and therefore, the UE may not move the next resource to the slot (n+3) within the first new shared COT.

As further shown in FIG. 8, at time 2, the UE may identify a second new shared COT during slot n+4. In example 800, slots n+4 and n+5 are included in the first new shared COT. In this case, slot n+5, which is within the second new shared COT, is 3 slots after the slot (n+2) in which the previous transmission occurred. Accordingly, moving the next resource to slot n+5 satisfies the adapting condition, and the UE may move the next resource from the initial slot (n+7) associated with that resource to the adapted slot (n+5) within the second new COT. The UE may then transmit the packet in slot n+5 without performing an LBT procedure or after performing a light LBT procedure (e.g., Cat2 LBT) instead of a full LBT procedure (e.g., Cat4 LBT).

As indicated above, FIG. 8 is provided as an example. Other examples may differ from what is described with respect to FIG. 8.

Figure 9:
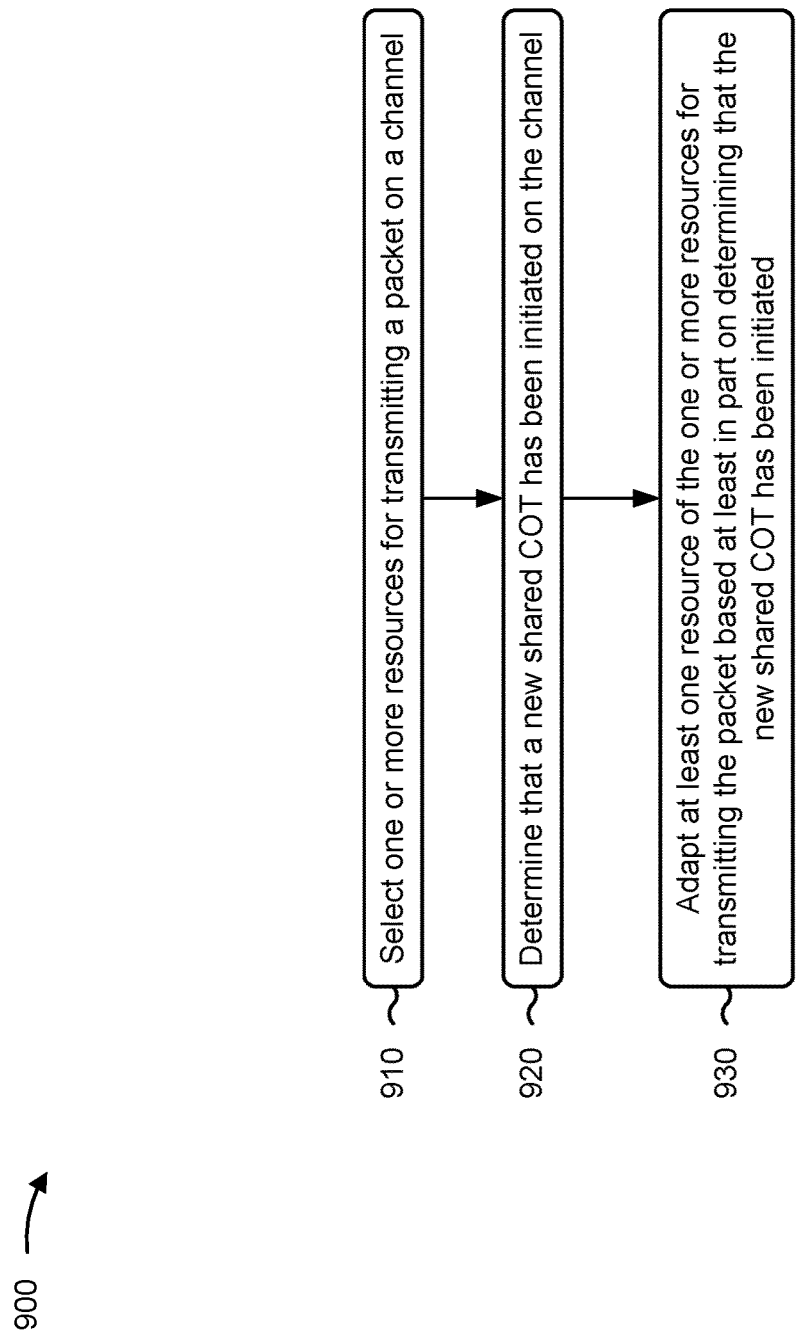
FIG. 9 is a diagram illustrating an example process associated with COT sharing aware resource selection for unlicensed CV2X communications, in accordance with the present disclosure.

FIG. 9 is a diagram illustrating an example process 900 performed, for example, by a UE, in accordance with the present disclosure. Example process 900 is an example where the UE (e.g., UE 120) performs operations associated with COT-sharing aware resource selection for unlicensed CV2X communications.

As shown in FIG. 9, in some aspects, process 900 may include selecting, from an available resource pool, one or more resources for transmitting a packet on a channel (block 910). For example, the UE (e.g., using selection component 1008, depicted in FIG. 10) may select, from an available resource pool, one or more resources for transmitting a packet on a channel, as described above, for example with reference to FIG. 6 (e.g., reference number 605).

As further shown in FIG. 9, in some aspects, process 900 may include determining that a new shared COT has been initiated on the channel (block 920). For example, the UE (e.g., using determination component 1010, depicted in FIG. 10) may determine that a new shared COT has been initiated on the channel, as described above, for example with reference to FIG. 6 (e.g., reference number 615).

As further shown in FIG. 9, in some aspects, process 900 may include adapting at least one resource of the one or more resources for transmitting the packet based at least in part on determining that the new shared COT has been initiated (block 930). For example, the UE (e.g., using adaptation component 1012, depicted in FIG. 10) may adapt at least one resource of the one or more resources for transmitting the packet based at least in part on determining that the new shared COT has been initiated, as described above, for example with reference to FIG. 6 (e.g., reference number 620).

Process 900 may include additional aspects, such as any single aspect or any combination of aspects described below and/or in connection with one or more other processes described elsewhere herein.

In a first aspect, process 900 includes transmitting the packet on the channel in the one or more resources including the at least one resource adapted based at least in part on determining that the new shared COT has been initiated. In a second aspect, alone or in combination with the first aspect, determining that the new shared COT has been initiated on the channel comprises tracking newly initiated shared COTs on the channel in a time window including the one or more resources selected for transmitting the packet, and determining, during the time window, that the new shared COT has been initiated on the channel. In a third aspect, alone or in combination with one or more of the first and second aspects, adapting the at least one resource of the one or more resources for transmitting the packet comprises moving a next resource of the one or more resources from an initial slot to an adapted slot within the new shared COT.

In a fourth aspect, alone or in combination with one or more of the first through third aspects, process 900 includes transmitting the packet on the channel in the adapted slot within the new shared COT. In a fifth aspect, alone or in combination with one or more of the first through fourth aspects, transmitting the packet on the channel in the adapted slot within the new shared COT comprises transmitting the packet on the channel in the adapted slot within the new shared COT without performing an LBT procedure. In a sixth aspect, alone or in combination with one or more of the first through fifth aspects, transmitting the packet in the adapted slot within the new shared COT comprises transmitting the packet on the channel in the adapted slot within the new shared COT without performing a Category 4 LBT procedure. In a seventh aspect, alone or in combination with one or more of the first through sixth aspects, transmitting the packet on the channel in the adapted slot within the new COT without performing the Category 4 LBT procedure comprises transmitting the packet on the channel in the adapted slot within the new shared COT after performing a Category 2 LBT procedure.

In an eighth aspect, alone or in combination with one or more of the first through seventh aspects, selecting, from the available resource pool, the one or more resources for transmitting the packet on the channel, comprises selecting initial slots for the one or more resources for transmitting the packet on the channel, determining that an existing shared COT is active on the channel, and moving a first resource of the one or more resources from the initial slot for the first resource to a slot within the existing shared COT. In a ninth aspect, alone or in combination with one or more of the first through eighth aspects, determining that the new shared COT has been initiated on the channel comprises receiving sidelink control information identifying the new shared COT that has been initiated on the channel.

In a tenth aspect, alone or in combination with one or more of the first through ninth aspects, adapting the at least one resource of the one or more resources for transmitting the packet comprises adapting the at least one resource based at least in part on determining that the new shared COT has been initiated and based at least in part on a determination that an adapting condition related to the one or more resources is satisfied. In an eleventh aspect, alone or in combination with one or more of the first through tenth aspects, adapting the at least one resource based at least in part on determining that the new shared COT has been initiated and based at least in part on the determination that the adapting condition related to the one or more resources is satisfied comprises moving the at least one resource from an initial slot to an adapted slot within the new COT based at least in part on a determination that the adapted slot is at least a threshold number of slots later than a slot associated with a previous transmission of the one or more resources.

In a twelfth aspect, alone or in combination with one or more of the first through eleventh aspects, the threshold number of slots is greater than one. In a thirteenth aspect, alone or in combination with one or more of the first through twelfth aspects, the threshold number of slots is based at least in part on a channel busy ratio of the channel. In a fourteenth aspect, alone or in combination with one or more of the first through thirteenth aspects, the threshold number of slots is based at least in part on a determination of whether the UE is performing blind re-transmissions of the packet or feedback-triggered re-transmissions of the packet. In a fifteenth aspect, alone or in combination with one or more of the first through fourteenth aspects, the threshold number of slots is based at least in part on a target total number of transmissions for the packet. In a sixteenth aspect, alone or in combination with one or more of the first through fifteenth aspects, the threshold number of slots is included in an indication received from a wireless network device.

In a seventeenth aspect, alone or in combination with one or more of the first through sixteenth aspects, the channel is in an unlicensed spectrum. In an eighteenth aspect, alone or in combination with one or more of the first through seventeenth aspects, the channel is associated with an unlicensed CV2X communication. In a nineteenth aspect, alone or in combination with one or more of the first through eighteenth aspects, selecting, from the available resource pool, the one or more resources for transmitting the packet on the channel comprises randomly selecting the one or more resources from the available resource pool. In a twentieth aspect, alone or in combination with one or more of the first through nineteenth aspects, selecting, from the available resource pool, the one or more resources for transmitting the packet on the channel comprises selecting a resource for a first transmission of the packet on the channel and one or more other resources for re-transmissions of the packet on the channel.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

FIG. 10 is a block diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include one or more of a selection component 1008, a determination component 1010, or an adaptation component 1012, among other examples.

In some aspects, the apparatus 1000 may be configured to perform one or more operations described herein in connection with FIGS. 6-8. Additionally, or alternatively, the apparatus 1000 may be configured to perform one or more processes described herein, such as process 900 of FIG. 9, or a combination thereof. In some aspects, the apparatus 1000 and/or one or more components shown in FIG. 10 may include one or more components of the UE described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the UE described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the UE described above in connection with FIG. 2. In some aspects, the transmission component 1004 may be co-located with the reception component 1002 in a transceiver.

The selection component 1008 may select, from an available resource pool, one or more resources for transmitting a packet on a channel. In some aspects, the selection component 1008 may include a controller/processor, a memory, or a combination thereof, of the UE described above in connection with FIG. 2. The determination component 1010 may determine that a new shared COT has been initiated on the channel. In some aspects, the determination component 1010 may include one or more antennas, a demodulator, a MIMO detector, a receive processor, a controller/processor, a memory, or a combination thereof, of the UE described above in connection with FIG. 2. The adaptation component 1012 may adapt at least one resource of the one or more resources for transmitting the packet based at least in part on determining that the new shared COT has been initiated. In some aspects, the adaptation component 1012 may include a controller/processor, a memory, or a combination thereof, of the UE described above in connection with FIG. 2.

The transmission component 1004 may transmit the packet on the channel in the one or more resources including the at least one resource adapted based at least in part on determining that the new shared COT has been initiated.

The transmission component 1004 may transmit the packet on the channel in the adapted slot within the new shared COT.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: selecting, from an available resource pool, one or more resources for transmitting a packet on a channel; determining that a new shared channel occupancy time (COT) has been initiated on the channel; and adapting at least one resource of the one or more resources for transmitting the packet based at least in part on determining that the new shared COT has been initiated.

Aspect 2: The method of Aspect 1, further comprising: transmitting the packet on the channel in the one or more resources including the at least one resource adapted based at least in part on determining that the new shared COT has been initiated.

Aspect 3: The method of any of Aspects 1-2, wherein determining that the new shared COT has been initiated on the channel comprises: tracking newly initiated shared COTs on the channel in a time window including the one or more resources selected for transmitting the packet; and determining, during the time window, that the new shared COT has been initiated on the channel.

Aspect 4: The method of any of Aspects 1-3, wherein adapting the at least one resource of the one or more resources for transmitting the packet comprises: moving a next resource of the one or more resources from an initial slot to an adapted slot within the new shared COT.

Aspect 5: The method of Aspect 4, further comprising: transmitting the packet on the channel in the adapted slot within the new shared COT.

Aspect 6: The method of Aspect 5, wherein transmitting the packet on the channel in the adapted slot within the new shared COT comprises: transmitting the packet on the channel in the adapted slot within the new shared COT without performing a listen-before-talk (LBT) procedure.

Aspect 7: The method of Aspect 5, wherein transmitting the packet in the adapted slot within the new shared COT comprises: transmitting the packet on the channel in the adapted slot within the new shared COT without performing a Category 4 listen-before-talk (LBT) procedure.

Aspect 8: The method of Aspect 7, wherein transmitting the packet on the channel in the adapted slot within the new COT without performing the Category 4 LBT procedure comprises: transmitting the packet on the channel in the adapted slot within the new shared COT after performing a Category 2 LBT procedure.

Aspect 9: The method of any of Aspects 1-8, wherein selecting, from the available resource pool, the one or more resources for transmitting the packet on the channel, comprises: selecting initial slots for the one or more resources for transmitting the packet on the channel; determining that an existing shared COT is active on the channel; and moving a first resource of the one or more resources from the initial slot for the first resource to a slot within the existing shared COT.

Aspect 10: The method of any of Aspects 1-9, wherein determining that the new shared COT has been initiated on the channel comprises: receiving sidelink control information identifying the new shared COT that has been initiated on the channel.

Aspect 11: The method of any of Aspects 1-10, wherein adapting the at least one resource of the one or more resources for transmitting the packet comprises: adapting the at least one resource based at least in part on determining that the new shared COT has been initiated and based at least in part on a determination that an adapting condition related to the one or more resources is satisfied.

Aspect 12: The method of Aspect 11, wherein adapting the at least one resource based at least in part on determining that the new shared COT has been initiated and based at least in part on the determination that the adapting condition related to the one or more resources is satisfied comprises: moving the at least one resource from an initial slot to an adapted slot within the new COT based at least in part on a determination that the adapted slot is at least a threshold number of slots later than a slot associated with a previous transmission of the one or more resources.

Aspect 13: The method of Aspect 12, wherein the threshold number of slots is greater than one.

Aspect 14: The method of any of Aspects 12-13, wherein the threshold number of slots is based at least in part on a channel busy ratio of the channel.

Aspect 15: The method of any of Aspects 12-14, wherein the threshold number of slots is based at least in part on a determination of whether the UE is performing blind re-transmissions of the packet or feedback-triggered re-transmissions of the packet.

Aspect 16: The method of any of Aspects 12-15, wherein the threshold number of slots is based at least in part on a target total number of transmissions for the packet.

Aspect 17: The method of any of Aspects 12-13, wherein the threshold number of slots is included in an indication received from a wireless network device.

Aspect 18: The method of any of Aspects 1-17, wherein the channel is in an unlicensed spectrum.

Aspect 19: The method of any of Aspects 1-18, wherein the channel is associated with an unlicensed cellular vehicle to everything (CV2X) communication.

Aspect 20: The method of any of Aspects 1-19, wherein selecting, from the available resource pool, the one or more resources for transmitting the packet on the channel comprises: randomly selecting the one or more resources from the available resource pool.

Aspect 21: The method of any of Aspects 1-20, wherein selecting, from the available resource pool, the one or more resources for transmitting the packet on the channel comprises: selecting a resource for a first transmission of the packet on the channel and one or more other resources for re-transmissions of the packet on the channel.

Aspect 22: An apparatus for wireless communication at a device, comprising a processor; memory coupled with the processor; and instructions stored in the memory and executable by the processor to cause the apparatus to perform the method of one or more of Aspects 1-21.

Aspect 23: A device for wireless communication, comprising a memory and one or more processors coupled to the memory, the one or more processors configured to perform the method of one or more of Aspects 1-21.

Aspect 24: An apparatus for wireless communication, comprising at least one means for performing the method of one or more of Aspects 1-21.

Aspect 25: A non-transitory computer-readable medium storing code for wireless communication, the code comprising instructions executable by a processor to perform the method of one or more of Aspects 1-21.

Aspect 26: A non-transitory computer-readable medium storing a set of instructions for wireless communication, the set of instructions comprising one or more instructions that, when executed by one or more processors of a device, cause the device to perform the method of one or more of Aspects 1-21.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   selecting, from an available resource pool, one or more resources for transmitting a packet on a channel;
   determining that a new shared channel occupancy time (COT) has been initiated on the channel; and
   adapting at least one resource of the one or more resources for transmitting the packet based at least in part on determining that the new shared COT has been initiated.

2. The method of claim 1, further comprising:
   transmitting the packet on the channel in the one or more resources including the at least one resource adapted based at least in part on determining that the new shared COT has been initiated.

3. The method of claim 1, wherein determining that the new shared COT has been initiated on the channel comprises:
   tracking newly initiated shared COTs on the channel in a time window including the one or more resources selected for transmitting the packet; and
   determining, during the time window, that the new shared COT has been initiated on the channel.

4. The method of claim 1, wherein adapting the at least one resource of the one or more resources for transmitting the packet comprises:
   moving a next resource of the one or more resources from an initial slot to an adapted slot within the new shared COT.

5. The method of claim 4, further comprising:
   transmitting the packet on the channel in the adapted slot within the new shared COT.

6. The method of claim 5, wherein transmitting the packet on the channel in the adapted slot within the new shared COT comprises:
   transmitting the packet on the channel in the adapted slot within the new shared COT without performing a listen-before-talk (LBT) procedure.

7. The method of claim 5, wherein transmitting the packet in the adapted slot within the new shared COT comprises:
   transmitting the packet on the channel in the adapted slot within the new shared COT without performing a Category 4 listen-before-talk (LBT) procedure.

8. The method of claim 7, wherein transmitting the packet on the channel in the adapted slot within the new COT without performing the Category 4 LBT procedure comprises:
   transmitting the packet on the channel in the adapted slot within the new shared COT after performing a Category 2 LBT procedure.

9. The method of claim 1, wherein selecting, from the available resource pool, the one or more resources for transmitting the packet on the channel, comprises:
   selecting initial slots for the one or more resources for transmitting the packet on the channel;
   determining that an existing shared COT is active on the channel; and
   moving a first resource of the one or more resources from the initial slot for the first resource to a slot within the existing shared COT.

10. The method of claim 1, wherein determining that the new shared COT has been initiated on the channel comprises:
    receiving sidelink control information identifying the new shared COT that has been initiated on the channel.

11. The method of claim 1, wherein adapting the at least one resource of the one or more resources for transmitting the packet comprises:
    adapting the at least one resource based at least in part on determining that the new shared COT has been initiated and based at least in part on a determination that an adapting condition related to the one or more resources is satisfied.

12. The method of claim 11, wherein adapting the at least one resource based at least in part on determining that the new shared COT has been initiated and based at least in part on the determination that the adapting condition related to the one or more resources is satisfied comprises:
moving the at least one resource from an initial slot to an adapted slot within the new COT based at least in part on a determination that the adapted slot is at least a threshold number of slots later than a slot associated with a previous transmission of the one or more resources.

13. The method of claim 12, wherein the threshold number of slots is greater than one.

14. The method of claim 12, wherein the threshold number of slots is based at least in part on a channel busy ratio of the channel.

15. The method of claim 12, wherein the threshold number of slots is based at least in part on a determination of whether the UE is performing blind re-transmissions of the packet or feedback-triggered re-transmissions of the packet.

16. The method of claim 12, wherein the threshold number of slots is based at least in part on a target total number of transmissions for the packet.

17. The method of claim 12, wherein the threshold number of slots is included in an indication received from a wireless network device.

18. A user equipment (UE) for wireless communication, comprising:
a memory; and
one or more processors coupled to the memory, the one or more processors configured to:
select, from an available resource pool, one or more resources for transmitting a packet on a channel;
determine that a new shared channel occupancy time (COT) has been initiated on the channel; and
adapt at least one resource of the one or more resources for transmitting the packet based at least in part on determining that the new shared COT has been initiated.

19. The UE of claim 18, wherein the one or more processors are further configured to:
transmit the packet on the channel in the one or more resources including the at least one resource adapted based at least in part on determining that the new shared COT has been initiated.

20. The UE of claim 18, wherein the one or more processors, to determine that the new shared COT has been initiated on the channel, are configured to:
track newly initiated shared COTs on the channel in a time window including the one or more resources selected for transmitting the packet; and
determine, during the time window, that the new shared COT has been initiated on the channel.

21. The UE of claim 18, wherein the one or more processors, to adapt the at least one resource of the one or more resources for transmitting the packet, are configured to move a next resource of the one or more resources from an initial slot to an adapted slot within the new shared COT, and wherein the one or more processors are further configured to:
transmit the packet on the channel in the adapted slot within the new shared COT.

22. The UE of claim 21, wherein the one or more processors, to transmit the packet on the channel in the adapted slot within the new shared COT, are configured to:
transmit the packet on the channel in the adapted slot within the new shared COT without performing a listen-before-talk (LBT) procedure.

23. The UE of claim 21, wherein the one or more processors, to transmit the packet in the adapted slot within the new shared COT, are configured to:
transmit the packet on the channel in the adapted slot within the new shared COT without performing a Category 4 listen-before-talk (LBT) procedure.

24. The UE of claim 23, wherein the one or more processors, to transmit the packet on the channel in the adapted slot within the new COT without performing the Category 4 LBT procedure, are configured to:
transmit the packet on the channel in the adapted slot within the new shared COT after performing a Category 2 LBT procedure.

25. The UE of claim 18, wherein the one or more processors, to select, from the available resource pool, the one or more resources for transmitting the packet on the channel, are configured to:
select initial slots for the one or more resources for transmitting the packet on the channel;
determine that an existing shared COT is active on the channel; and
move a first resource of the one or more resources from the initial slot for the first resource to a slot within the existing shared COT.

26. The UE of claim 18, wherein the one or more processors, to determine that the new shared COT has been initiated on the channel, are configured to:
receive sidelink control information identifying the new shared COT that has been initiated on the channel.

27. The UE of claim 18, wherein the one or more processors, to adapt the at least one resource of the one or more resources for transmitting the packet, are configured to:
adapt the at least one resource based at least in part on determining that the new shared COT has been initiated and based at least in part on a determination that an adapting condition related to the one or more resources is satisfied.

28. The UE of claim 27, wherein the one or more processors, to adapt the at least one resource based at least in part on determining that the new shared COT has been initiated and based at least in part on the determination that the adapting condition related to the one or more resources is satisfied, are configured to:
move the at least one resource from an initial slot to an adapted slot within the new COT based at least in part on a determination that the adapted slot is at least a threshold number of slots later than a slot associated with a previous transmission of the one or more resources.

29. A non-transitory computer-readable medium storing a set of instructions for wireless communication, the set of instructions comprising:
one or more instructions that, when executed by one or more processors of a user equipment (UE), cause the UE to:
select, from an available resource pool, one or more resources for transmitting a packet on a channel;
determine that a new shared channel occupancy time (COT) has been initiated on the channel; and
adapt at least one resource of the one or more resources for transmitting the packet based at least in part on determining that the new shared COT has been initiated.

30. An apparatus for wireless communication, comprising:
- means for selecting, from an available resource pool, one or more resources for transmitting a packet on a channel;
- means for determining that a new shared channel occupancy time (COT) has been initiated on the channel; and
- means for adapting at least one resource of the one or more resources for transmitting the packet based at least in part on determining that the new shared COT has been initiated.

* * * * *